United States Patent
Hur et al.

(10) Patent No.: US 9,557,972 B2
(45) Date of Patent: Jan. 31, 2017

(54) SYSTEM AND METHOD FOR CODE RECOMMENDATION AND SHARE

(71) Applicant: Electronics and Telecommunications Research Institute, Daejeon (KR)

(72) Inventors: Cin Young Hur, Daejeon (KR); Tae Dong Lee, Suwon-si (KR)

(73) Assignees: Electronics and Telecommunications Research Institute, Daejeon (KR); SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/667,963

(22) Filed: Mar. 25, 2015

(65) Prior Publication Data

US 2015/0277860 A1    Oct. 1, 2015

(30) Foreign Application Priority Data

Mar. 25, 2014 (KR) .................. 10-2014-0034638

(51) Int. Cl.
  *G06F 9/44* (2006.01)
  *G06F 9/445* (2006.01)

(52) U.S. Cl.
  CPC . *G06F 8/36* (2013.01); *G06F 8/33* (2013.01); *G06F 9/44526* (2013.01)

(58) Field of Classification Search
  None
  See application file for complete search history.

(56) References Cited

U.S. PATENT DOCUMENTS

| | | | |
|---|---|---|---|
| 8,535,636 B1 | 9/2013 | Eun et al. | |
| 8,560,606 B2* | 10/2013 | Chakra | G06Q 10/101 705/319 |
| 9,021,416 B2* | 4/2015 | Grechanik | G06F 8/36 707/708 |
| 9,053,235 B1* | 6/2015 | Bienkowski | G06F 11/3604 |
| 2002/0138617 A1* | 9/2002 | Christfort | G06F 17/30905 709/225 |
| 2006/0253508 A1* | 11/2006 | Colton | G06F 8/52 |
| 2008/0201690 A1* | 8/2008 | Lovisa | G06F 8/36 717/107 |
| 2009/0171999 A1* | 7/2009 | McColl | G06F 17/30539 |
| 2009/0193148 A1* | 7/2009 | Jung | H04L 67/16 709/246 |

(Continued)

FOREIGN PATENT DOCUMENTS

KR    1020090083835 A    8/2009

OTHER PUBLICATIONS

U.S. Appl. No. 61/822,249, filed May 2013, Lee, Tae-Dong.*

*Primary Examiner* — Wei Zhen
*Assistant Examiner* — Hossain Morshed
(74) *Attorney, Agent, or Firm* — William Park & Associates Ltd.

(57) ABSTRACT

Disclosed is a system for code recommendation and share, including: an editor plug-in extracting source code unit information of a developer by interlocking with an editor of the developer; and a code recommendation server including a code repository storing code data, wherein the code recommendation server selects recommendation code data in the code repository through a code recommendation algorithm based on the source code unit information of the developer extracted in the editor plug-in.

16 Claims, 16 Drawing Sheets

(56) References Cited

U.S. PATENT DOCUMENTS

| | | | | |
|---|---|---|---|---|
| 2009/0204594 A1* | 8/2009 | Akkiraju | .................... | G06F 8/34 |
| 2011/0035435 A1* | 2/2011 | Meng | ........................ | G06F 9/54 |
| | | | | 709/203 |
| 2011/0224811 A1* | 9/2011 | Lauwers | .................... | G06F 3/16 |
| | | | | 700/94 |
| 2012/0233597 A1* | 9/2012 | Ogasawara | ........... | G06F 8/4441 |
| | | | | 717/124 |
| 2013/0080993 A1* | 3/2013 | Stravers | .................... | G06F 8/35 |
| | | | | 717/104 |
| 2013/0151945 A1* | 6/2013 | Cui | ........................ | G06F 17/21 |
| | | | | 715/234 |
| 2013/0246392 A1* | 9/2013 | Farmaner | .......... | G06F 17/30442 |
| | | | | 707/713 |
| 2014/0032480 A1* | 1/2014 | Lesage | .................. | G06F 17/243 |
| | | | | 707/607 |
| 2014/0089895 A1* | 3/2014 | Clee | ......................... | G06F 8/71 |
| | | | | 717/121 |
| 2014/0095971 A1* | 4/2014 | Gowen | ................. | G06F 3/0484 |
| | | | | 715/226 |
| 2014/0173555 A1* | 6/2014 | Ng | ............................ | G06F 8/30 |
| | | | | 717/109 |
| 2014/0173563 A1* | 6/2014 | Dias | ......................... | G06F 8/74 |
| | | | | 717/123 |
| 2014/0173574 A1* | 6/2014 | Schmidt | .................. | G06F 8/427 |
| | | | | 717/143 |
| 2014/0337372 A1* | 11/2014 | Lee | ........................... | G06F 8/30 |
| | | | | 707/767 |
| 2014/0365519 A1* | 12/2014 | Middelfart | ........ | G06F 17/30477 |
| | | | | 707/769 |
| 2015/0277860 A1* | 10/2015 | Hur | .......................... | G06F 8/36 |
| | | | | 717/110 |
| 2016/0070547 A1* | 3/2016 | Ramanathan | ............. | G06F 8/36 |
| | | | | 717/107 |

* cited by examiner

FIG. 4B

```
 1 Apply Matching Criteria on Target Units
 2
 3 Total Number of Target Units in Repository : 30089
 4
 5 ------------------- Stage 1 : Filtering by Type
 6 SOURCE UNIT TYPE: 42
 7 Inference Related Types of Target Units......
 8 Number of Filtered Target Units: 15488
 9
10 ------------------- Stage 2 : Truncating by Window Size
11 ORIGINAL TARGET UNITS: d[this] = a
12 TRUNCATED TARGET UNITS: d[this] = a
13 ORIGINAL TARGET UNITS: c = function c(a, b) {
14   return new c.fn.init(a, b);
15 }
16 TRUNCATED TARGET UNITS: c = function c(a, b) {
17   return new c.fn.init(a, b);
18 }
19 ORIGINAL TARGET UNITS: a = function a(k) {
20   var n = s.createElement("div");
21   k = ("on" + k);
22   var r = (k in n);
23   if ((! r))
24     {
25       n.setAttribute(k, "return;");
26       r = ((typeof n[k]) === "function");
27     }
28   return r;
29 }
30 TRUNCATED TARGET UNITS: a = function a(k) {...
31 .....
32
33 ------------------- Stage 3 : Computing Diff and Sorting Recommendations
34 .....
35
36 DIFF DEGREE: 111   TEXT: function () {
37   var inputdata = customdeviceinstance.receivemessage();
38
39 DIFF DEGREE: 133   TEXT: function (keycode) {
40   var self = this;
41   astdebug.printinfo("astkeywordinput.keydown() Begin");
42
43 DIFF DEGREE: 139   TEXT: input : {
44   access_token : "your_token",
45   targetUrl : "www.tistory.com",
46   output : "json"
47 }
48
49 DIFF DEGREE: 141   TEXT: var youtube_025_4 = {
50   url : "https://gdata.youtube.com/feeds/api/charts/live/events/recently_broadcasted",
51   type : "get",
52   input : {
53
54 DIFF DEGREE: 146   TEXT: input : {
55   access_token : "your_token",
56   targetUrl : "www.tistory.com",
57   postId : "postId",
58   output : "json"
59 }
60
61 DIFF DEGREE: 156   TEXT: d.innerHTML = "  <link/><table></table><a href='/a' style='color
62
63 ......
```

| LENGTH OF UNIT TEXT | UNIT TYPE | | | | | |
|---|---|---|---|---|---|---|
| | Function call | String literal | object literal field | Function Declaration | Assignment | Block |
| MEDIA VALUE | 31 | 8 | 23 | 150 | 29 | 77.5 |
| AVERAGE | 352.223 | 11.061 | 94.885 | 443.556 | 118.038 | 182.988 |

FIG. 11

```
UNIT TEXT: input
================parsing Start
input;              ---> Inferred type of Source Unit: 15 JAVASCRIPT_UNIT
input;              ---> Inferred type of Source Unit: 21 EXPRESSION_STATEMENT
input               ---> Inferred type of Source Unit: 42 SIMPLE_NAME
```
— 1100

```
CONTEXT (Black Text): input
================parsing Start
url='https://www.tistory.com/apis/comment/delete';
input={};
url='https://www.tistory.com/apis/comment/delete';
                    ---> Inferred type of Source Unit: 19 JAVASCRIPT_UNIT
                    ---> Inferred type of Source Unit: 21 EXPRESSION_STATEMENT
url='https://www.tistory.com/apis/comment/delete'
                                        ---> Inferred type of Source Unit: 7 ASSIGNMENT
url                 ---> Inferred type of Source Unit: 42 SIMPLE_NAME
'https://www.tistory.com/apis/comment/delete'
                                        ---> Inferred type of Source Unit: 45 STRING_LITERAL
input={};           ---> Inferred type of Source Unit: 21 EXPRESSION_STATEMENT
input={}            ---> Inferred type of Source Unit: 7 ASSIGNMENT
input               ---> Inferred type of Source Unit: 42 SIMPLE_NAME
{}                  ---> Inferred type of Source Unit: 85 OBJECT_LITERAL
================parsing End
```
— 1110

```
{
  "keyword": "input",
  "window": 10,
  "type": 42,
  "context": "₩r₩nurl = 'https://www.tistory.com/apis/comment/delete';₩r₩ninput = {};₩r₩n"
}
```
— 1120

SYSTEM AND METHOD FOR CODE RECOMMENDATION AND SHARE

This application claims the benefit of priority of Korean Patent Application No. 10-2014-0034638 filed on Mar. 25, 2014, which is incorporated by reference in its entirety herein.

BACKGROUND OF THE INVENTION

Field of the Invention

The present invention relates to a system and a method for code recommendation and share, and more particularly, to a system and a method for recommending a code to mashup developers by using a plug-in by closely contacting a development environment.

Discussion of the Related Art

1) Enhanced Editor

Strong integrated development environments including Eclipse, NetBeans, Visual Studio, and the like greatly help increasing development efficiency. In particular, the enhanced editor is easily operated because a source code is configured by Abstract Syntax Tree. The editor automatically supports a grammar check. The editor provides a function to deduce a data format, an expression equation, and a sentence of a variable and displays an error or a warning by annotation in the source code. Further, the editor provides convenient interactions by using a keyboard and a mouse. Usability of the editor needs to be increased based on various interactions including block catching, a mouse hover, click, drag, and the like.

2) Code Repository

The code repository exists in various formats according to a programming language. Text type codes pile up, but a function to discover codes which may be used by a developer is actually insufficient. The codes are stored as a file and there is a limit that the developer needs to check the source code with their eyes one by one even though the codes are discovered through a search engine. The sizes of codes required by the developer are diversified up to one file from a few lines of codes in variable declaration and there are a lot of cases that the code repository stores the codes as the file without such a distinction. Accordingly, a function to provide a code piece suitable for a development context is required.

3) Consideration of Development Action

A lot of developers of beginner developers to advanced developers frequently use a method that develops a mashup while selecting a more appropriate example and thereafter, editing the example. There are a lot of cases that a search portal is used to discover the appropriate example at the time of developing the mashup. The developers determine an example code based on question writing and implementation success examples of other developers. Since an environment in which the development is actually made is the editor, a gap exists between the search action and the development action. The uppermost limit can solved through an editor enhanced with the plug-in and a recommended server. Development actions of repeating search, copy, and edition need to be efficiently enhanced through determining a development context from the source code of the developer and recommending an example code which is most similar to the context.

SUMMARY OF THE INVENTION

An object of the present invention is to increase development productivity by recommending example codes in accordance with a context which a developer inputs a code and apply the example codes to various development environments by providing the example codes to a development tool in a plug-in type.

In accordance with an embodiment of the present invention, a method for code recommendation and share includes: extracting, by an editor plug-in that interworks with an editor of a developer, source code unit information of the developer; and selecting, by a code recommendation server, recommendation code data in the code repository through a code recommendation algorithm based on the source code unit information of the developer extracted in the editor plug-in. The method may further include: receiving, by the editor plug-in, the recommendation code data from the code recommendation server and providing the received recommendation code data to the editor; inserting the code unit selected by the editor and into the source code; and reporting the selected code unit to the code recommendation server.

The selecting of the recommendation code data may include a first step of filtering a target unit—the target unit means a code unit which is stored in the code repository and becomes the recommendation code—by deducing a type having high correlation with the type of the source code unit based on type information of the source code unit, a second step of adjusting the length of the target unit to suit the window size based on window size information of the source code unit, and a third step of arranging the recommendation code by calculating a similarity between a block text containing basic string matching or a front and back context of the source unit text and the target unit based on context information of the source code unit.

Step 3 may include one of finally selecting only upper N recommendation code units by arranging the recommendation code by calculating the similarity between the block text and the target unit when the context information exists, and selecting the recommendation code through the basic string matching when the context information does not exist.

Data of the source code unit extracted through the editor plug-in may be constituted by string information, type information, window size information, and context information—the context information includes a block text with a predetermined length, which includes a unit string—of a source code unit which the developer inputs or highly interests in.

The recommendation code data may be constituted by the string of the recommendation code and a matching score indicating a matching degree with the context of the developer.

The method may further include storing the source code unit in the code repository as code data to be recommended later when the code recommendation server receives the source code unit through the editor plug-in.

The method may further include, wherein the code repository may be provided in plural, calling, by the code recommendation server, code data from a third party repository and analyzing a programming language, a syntax, and granularity for the code data stored in the third party repository through a repository adaptor.

According to a system and a method of code recommendation and share, first, development productivity is increased and extension is easy. The reason is that example codes are recommended according to a context in which a mashup developer input a code and the example codes are installed in the existing development tool in a plug-in type.

Since the code made by the developer is accumulated in a repository during using a plug-in, substantially useful code units become sufficient. Since this is connected to codes to be recommended to other developers again, a source code can be consistently shared.

BRIEF DESCRIPTION OF THE DRAWINGS

FIG. 4B is a diagram illustrating the embodiment of the selection and matching of the recommended target code;

FIG. 5C is a diagram illustrating an embodiment of the code repository;

FIG. 10 illustrates an embodiment of setting a window size for each unit type;

FIG. 11 is a diagram illustrating an embodiment of a process of configuring a source unit according to the embodiment of the present invention.

DETAILED DESCRIPTION OF THE EMBODIMENTS

Figure 1:
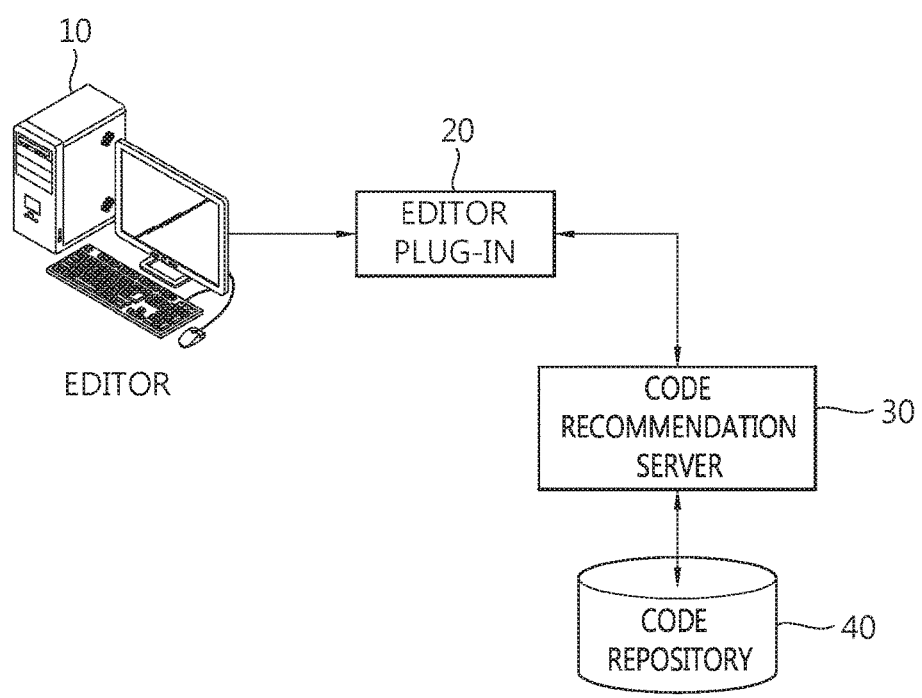
FIG. 1 is a block diagram schematically illustrating a configuration of a code recommendation and share system according to an embodiment of the present invention.

The present invention may have various modifications and various embodiments and specific embodiments will be illustrated in the drawings and described in detail.

However, this does not limit the present invention to specific embodiments, and it should be understood that the present invention covers all the modifications, equivalents and replacements within the idea and technical scope of the present invention.

Terms such as first or second may be used to describe various components but the components are not limited by the above terminologies. The above terms are used only to discriminate one component from the other component. For example, without departing from the scope of the present invention, a first component may be referred to as a second component, and similarly, the second component may be referred to as the first component. A terminology such as and/or includes a combination of a plurality of associated items or any item of the plurality of associated items.

It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, it is understood that no element is not present between the element and the other element.

Terms used in the present application are used only to describe specific embodiments, and are not intended to limit the present invention. A singular form may include a plural form if there is no clearly opposite meaning in the context. In the present application, it should be understood that term "include" or "haveindicates that a feature, a number, a step, an operation, a component, a part or the combination thereof described in the specification is present, but does not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms which are defined in a generally used dictionary should be interpreted to have the same meaning as the meaning in the context of the related art, and are not interpreted as an ideally or excessively formal meaning unless clearly defined in the present invention.

Hereinafter, a preferable embodiment of the present invention will be described in more detail with reference to the accompanying drawings. In describing the present invention, like reference numerals refer to like elements for easy overall understanding and a duplicated description of like elements will be omitted.

FIG. 1 is a block diagram schematically illustrating a configuration of a code recommendation and share system according to an embodiment of the present invention. As illustrated in FIG. 1, the code recommendation and share system according to the embodiment of the present invention may include an editor 10, an editor plug-in 20, a code recommendation server 30, and a code repository 40.

Referring to FIG. 1, the editor 10 is a component for to develop a mashup program. The mashup program may be made through a source code and the editor 10 may receive a recommendation code from the code recommendation server 30 through the editor plug-in 20 in order to support an edition which is smooth and suitable for a context.

The editor plug-in 20 is a component for recommending the source code in the editor 10. The editor plug-in 20 may communicate with the editor 10 and the code recommendation server 30. The editor plug-in monitors a user input in the editor 10. In addition, the editor plug-in extracts source code unit information associated with the user input and transmits the extracted source code unit information to the code recommendation server 30. In this case, the extracted source code unit information may include information on a predetermined item. Hereinafter, this will be described in detail in association with a source code data structure. The editor plug-in 20 may receive recommendation code data (may include a plurality of code units) from the code recommendation server 30 and provide the received recommendation code data to the editor 10 and receive selection of at least any one of the recommendation code data from the editor 10. The received recommendation code may be inserted into the source code of the editor 10 and the editor plug-in 20 may report the selected code to the code recommendation server 30.

The code recommendation server 30 receives the user input or interested source code information in the editor 20 from the editor plug 20 to select a recommendation code associated with the source code information. The code recommendation server 30 as a database for selecting the recommendation code may include the code repository 40. The code repository 40 may be positioned inside or outside the code recommendation server 30. That is, more resources for selecting the recommendation code may be secured by accessing a third repository other than the code repository 40 included in the code recommendation server 30. The code recommendation sever 30 selects the recommendation code data through a specific code recommendation algorithm and hereinafter, this will be described in detail in a description part of an operation process of the code recommendation server 30.

Figure 2:
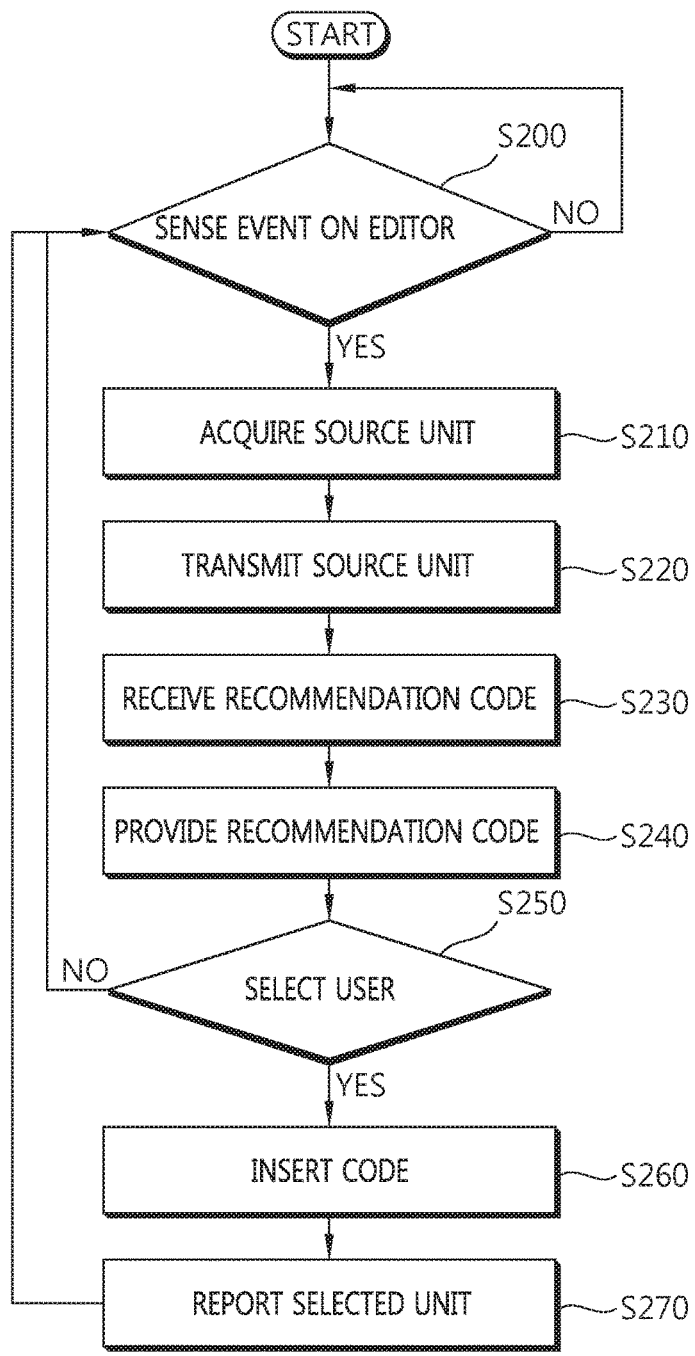
FIG. 2 is a flowchart illustrating an operation process of an editor plug-in of the code recommendation and share system according to the embodiment of the present invention.

FIG. 2 is a flowchart illustrating an operation process of an editor plug-in of the code recommendation and share system according to the embodiment of the present invention.

Referring to FIG. 2, the editor plug-in is plugged in the editor to support seamless and contextual edition. First, various interactions in the editor are monitored (S200). In addition, information on a source code unit which a developer inputs or is careful of is extracted (S210). In addition, the extracted code unit information is transmitted to a code recommendation server (S220). The code recommendation server that receives the source code unit information selects an appropriate recommendation code data by parsing the source code unit information and transmits the selected recommendation code data to the editor plug-in again. In addition, the editor plug-in responds to a recommendation code from the code recommendation server (S230). Thereafter, the editor plug-in displays recommendation codes on the editor (S240) and receives selection of a specific code a plurality of recommendation codes (S250). If there is no selection from the developer, the process proceeds to the monitoring step (S200) again. When the developer selects the specific code, the editor plug-in inserts the selected code into the source code (S260). In addition, the selected code unit is reported to the code recommendation server (S270) and stands by in the monitoring step (S200) for a next event again.

Figure 3:
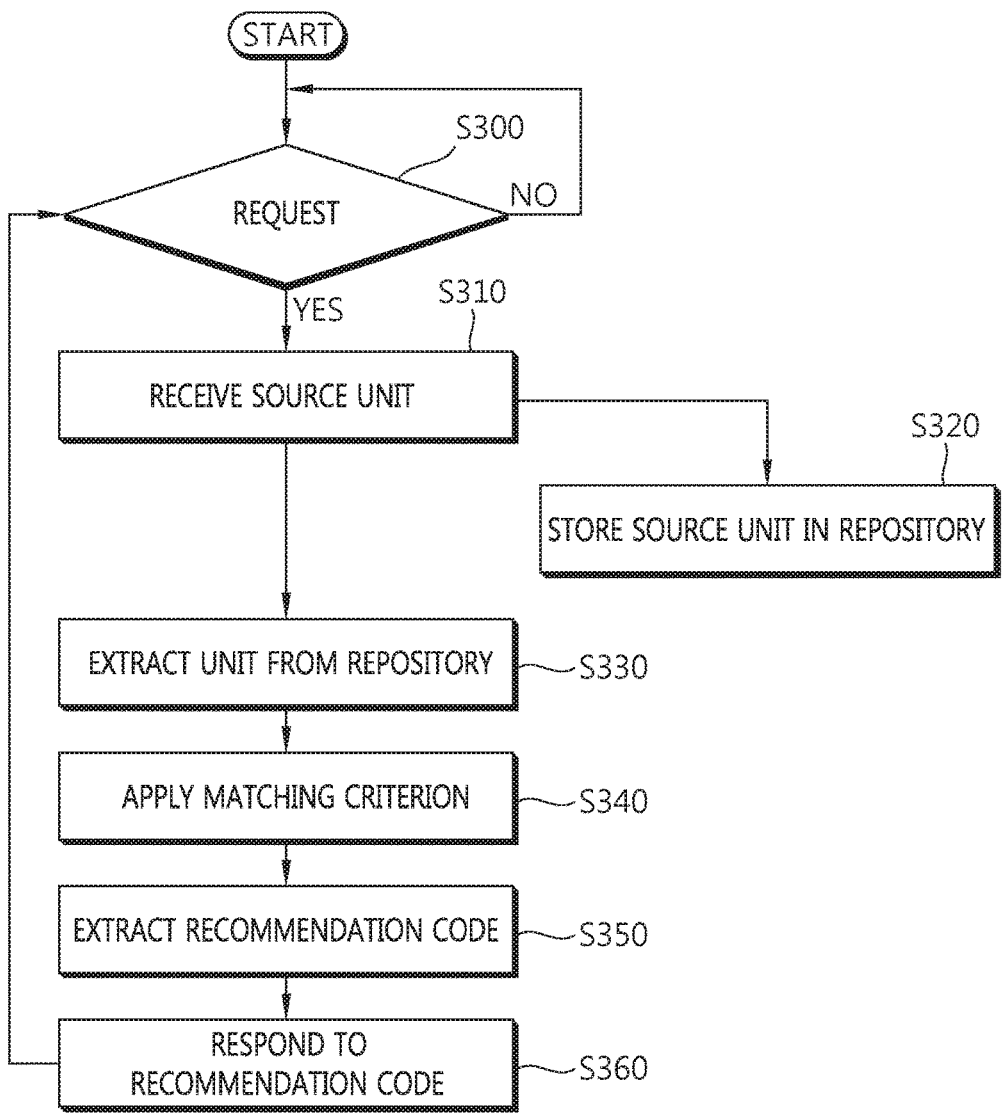
FIG. 3 is a flowchart illustrating an operation process of a code recommendation server of the code recommendation and share system according to the embodiment of the present invention.

FIG. 3 is a flowchart illustrating an operation process of a code recommendation server of the code recommendation and share system according to the embodiment of the present invention.

Referring to FIG. 3, the code recommendation server continuously stands by for a request in order to recommend the source code to the developer (S300). When the source code unit is received form the editor through the editor plug-in (S310), the received source code unit is first stored in the code repository (S320). This is to use the source code unit as code data to be recommended later. That is, more code data may be gradually stored in the code repository as time goes by and resources for recommendation become more massive, and as a result, diversity of the recommendation codes may increase. In addition, the code recommendation unit may call the source code units from various code repositories (S330). Further, various matching criteria are applied to recommend the source code suitable for the context of the developer (S340). A process of calling and analyzing the source code to be recommended is called from various code repositories will be described through FIG. 4A. Moreover, the code recommendation unit selects the recommendation code through the matching criteria (S350) and responds to the editor with the recommendation code (S360). After the response, the process may return to the request stand-by step (S300) again.

Figure 4A:
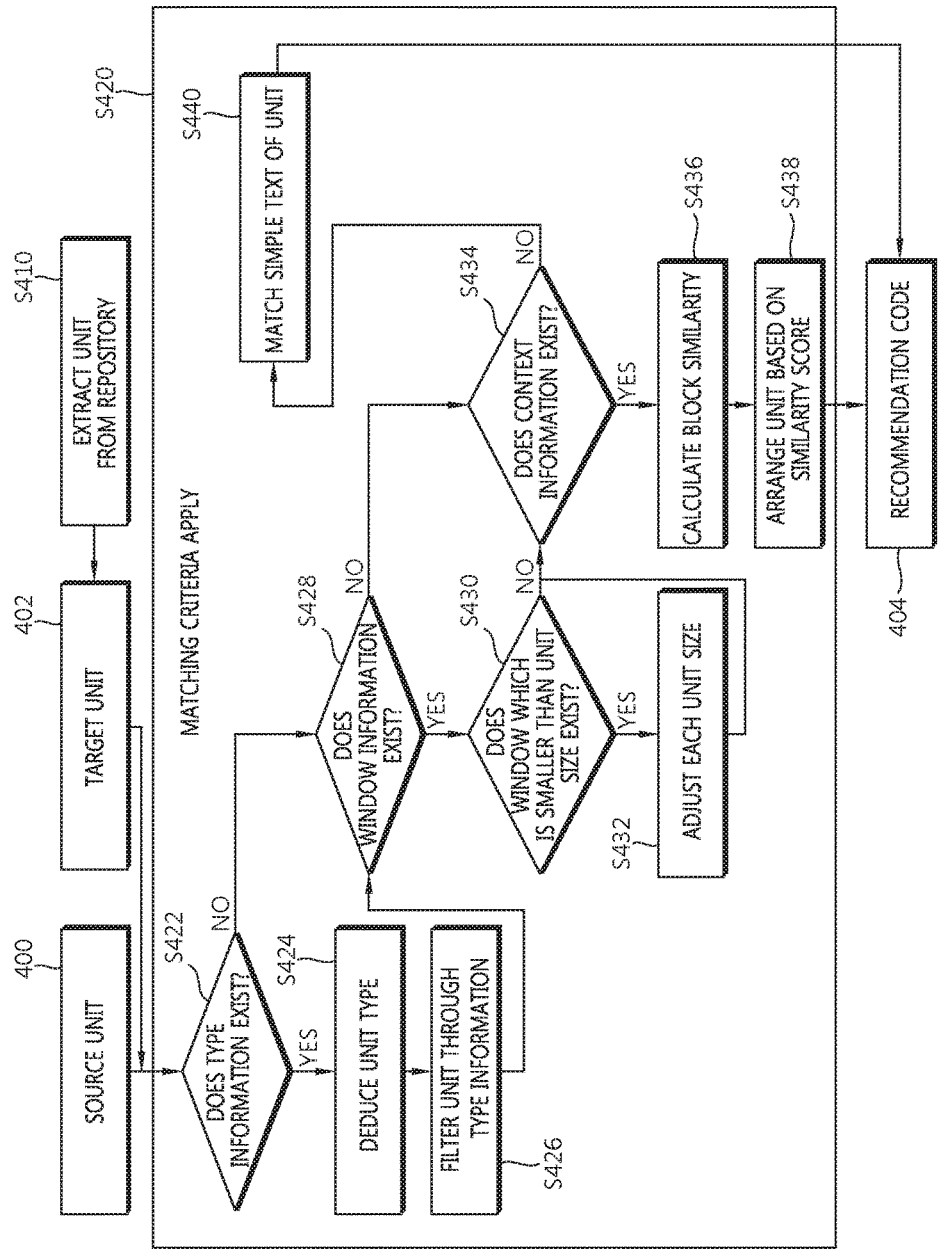
FIG. 4A is a flowchart of selection and matching of a recommended target code of the code recommendation and share system according to the embodiment of the present invention.

FIG. 4A is a flowchart of selection and matching of a recommended target code of the code recommendation and share system according to the embodiment of the present invention.

Referring to FIG. 4A, first, the code recommendation server receives a source unit 400 and extracts multiple target units 402 (the target unit may mean a resource unit which may be stored in the code repository and become a recommendation code 404) stored in the code repository (S410).

In addition, the code recommendation server selects the recommendation code 404 among the multiple target units 402 by applying the matching criteria (S420).

When the step (S420) of selecting the recommendation code 404 by applying the matching criteria is described in more detail, the recommendation code 404 may be selected through a stepwise process of steps 1 to 3.

First, in step 1 (S422 to S426), it is determined whether time information exists in the source unit 400 (S422) and when the type information exists in the source unit 400, steps S423 to S426 are performed and when the type information does not exist in the source unit 400, the process proceeds to step 2 (S428 to S432). In step 1, when the type information exists in the source unit 400, the code recommendation server induces a type which has high correlation with the type of the source unit 400 (S424). In addition, the target unit 402 is filtered according to the induced type information (S426).

In step 2, it is determined whether window size information exists in the source unit 400 (S428) and when the window size information exists in the source unit 400, steps S430 to S432 are performed and when the window size information does not exist in the source unit 400, the process proceeds to step 3 (S434 to S440). In step 2, when the window size information exists in the source unit 400 and the length of the target unit 402 is larger than a window size (S430), the size of each unit is adjusted (S432). That is, the length is cut as large as the window size. When the length of the target unit 402 is smaller than the window size, the process proceeds to step 3 without the size adjusting step (S432).

In step 3, it is determined whether context information exists in the source unit 400 (S434) and when the context information exists in the source unit 400, the process proceeds to a block similarity calculating step (S438) and when the context information does not exist in the source unit 400, the process proceeds to a basic string matching step (S440). When the context information exists in the source unit 400, the context information includes a block text containing a front and back context of a unit text. The code recommendations server calculates similarity between the block text and the target unit 402 (S436). The recommendation code 404 is arranged according to the similarity (S438). Through such a process, only upper N recommendation codes 404 are finally selected to be transferred to the editor.

FIGS. 4B and 4C are diagrams illustrating an actual embodiment of the selection and matching of the recommended target code.

Referring to FIGS. 4B and 4C, as a part of a log in an execution process, a process of selecting and matching the recommendation target code through a total of three times is illustrated. For example, first approximately 30 thousands of target units are summarized into 15 thousands of targets through the type filtering step in step 1. In addition, the lengths of some target units are adjusted through the step of cutting the target unit with the window size in step 2. Upper recommendation target codes are extracted through the process of calculating the similarity between the source unit and the target unit and arranging the recommendation code.

Figure 5A:
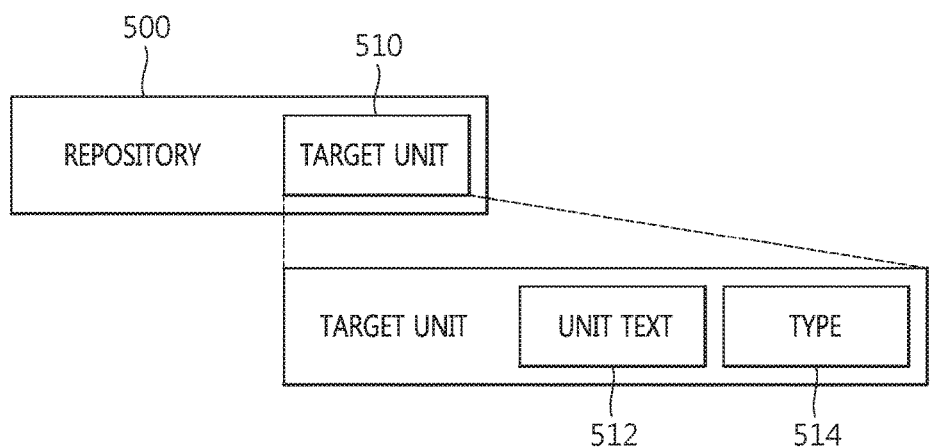
FIG. 5A is a diagram illustrating a data structure of a code repository according to the embodiment of the present invention.

FIG. 5A is a diagram illustrating a data structure of a code repository according to the embodiment of the present invention.

Referring to FIG. 5A, numerous target units 510 may be stored in a code repository 500. The target unit 510 is constituted by a unit text 512 and unit type information 514 and a process of storing the target unit 510 will be described with reference to FIG. 12. The unit text 512 as a text of the code unit may include URL information, type information, input information, and the like. The unit type information 514 may information that represents how the corresponding source unit is expressed and include various types such as Function call, String literal, Object literal field, Function Declaration, Assignment, Block, and the like.

Figure 5B:
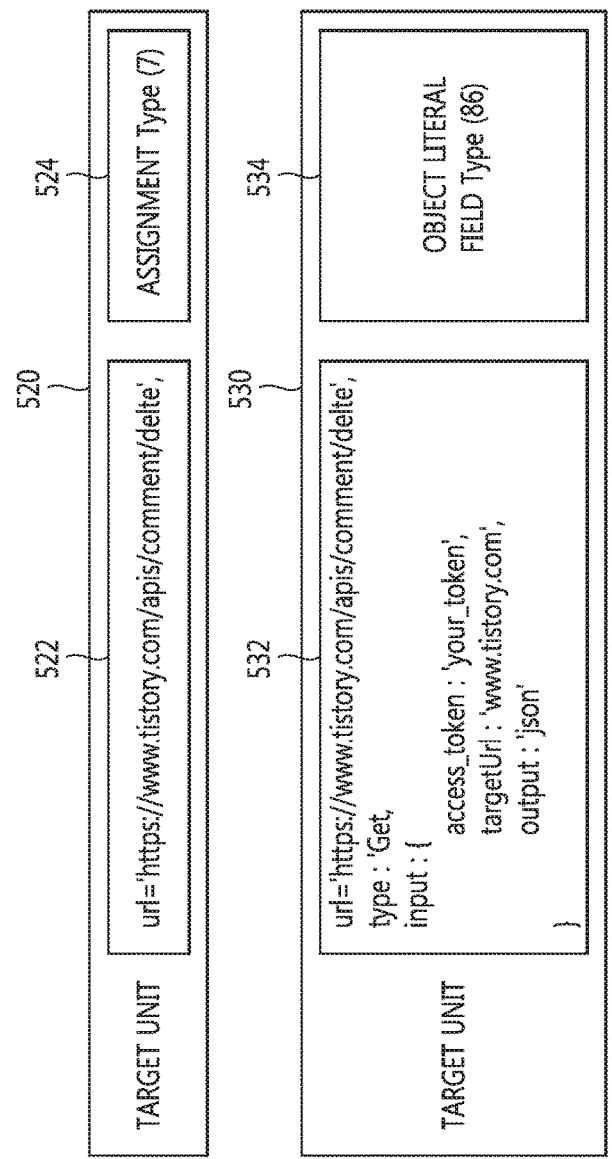
FIG. 5B is a diagram illustrating an embodiment of data stored in the code repository according to the embodiment of the present invention.

FIG. 5B is a diagram illustrating an embodiment of data stored in the code repository according to the embodiment of the present invention.

Referring to FIG. 5B, a target unit 520 as unit text information 522 includes the URL information and the unit type information 524 is an ASSIGNMENT Type and 7 in parenthesis represents a type ID. Further, another target unit 530 as unit text information 532 includes the URL information, the type information, and the input information and the unit type information 534 is an OBJECT LITERAL FIELD Type and reference numeral 86 represents the type ID.

Figure 5C:
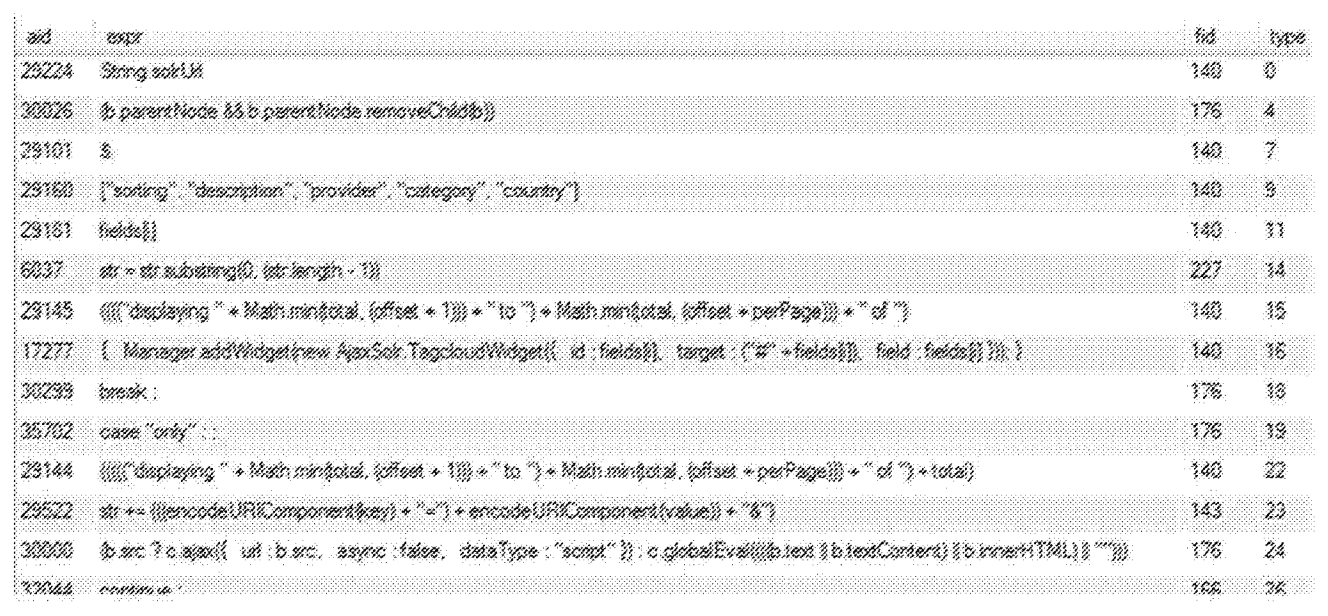

FIG. 5C is a diagram illustrating an embodiment of the code repository. As illustrated in FIG. 5C, a code unit reported through the plug-in of the editor may be automatically accumulated in the code repository.

Figure 6A:
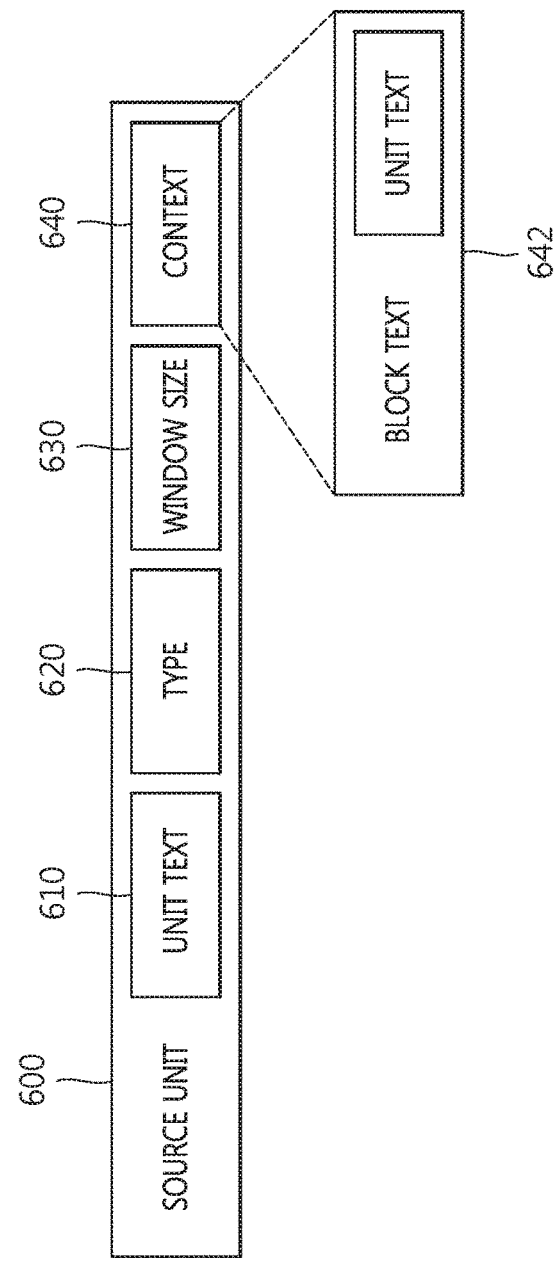
FIG. 6A is a diagram illustrating a data structure of a source code unit transmitted from an editor according to the embodiment of the present invention.

FIG. 6A is a diagram illustrating a data structure of a source code unit transmitted from the editor according to the embodiment of the present invention.

Referring to FIG. 6A, a data structure of a source code unit extracted by the editor of the developer and transmitted to the recommendation server is illustrated. The data structure is constituted by a string 610 of the source code unit, a unit type 620, the length (window size) 630 of a code to be recommended, and a context 640. The context 640 as a block text with a predetermined length, which includes the unit string may include the unit text.

Figure 6B:
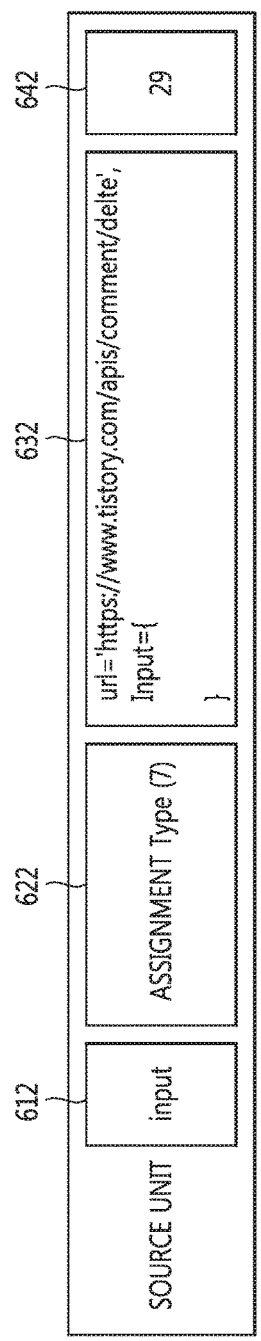
FIG. 6B is a diagram illustrating an embodiment of source code unit data according to the embodiment of the present invention.

FIG. 6B is a diagram illustrating an embodiment of source code unit data according to the embodiment of the present invention. As illustrated in FIG. 6B, as an embodiment of the source code unit, the unit text 612, the unit type 622, and information on the context 632 and the window size 642 may be expressed as input, ASSIGNMENT, and 29, respectively.

Figure 7:
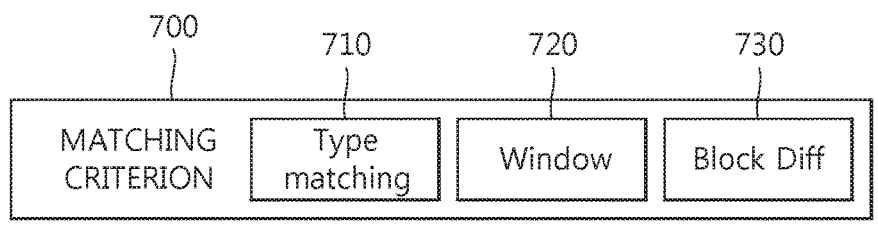
FIG. 7 is a diagram illustrating a matching condition used by a code recommendation server according to the embodiment of the present invention.

FIG. 7 is a diagram illustrating a matching condition used by the code recommendation server according to the embodiment of the present invention.

Referring to FIG. 7, the code recommendation server possesses a matching condition 700 used for selecting numerous source codes called from the code repository and determining a priority. According to the embodiment of the present invention, the matching condition 700 generally includes three conditions. That is, three conditions may be 1) type matching 710 based on the unit type, 2) window matching 720 based on the length (window size) of the code requested by the developer, and 3) block similarity matching 730 based on similarity with the block string. Herein, through steps 1 to 3 of FIG. 3 described above, sequentially, the target unit is primarily filtered through the type matching 710, the length of the target unit is secondarily adjusted through the window matching 720, and last, upper N recommendation codes having high similarity are filtered out through the block similarity matching 730. Herein, N may be previously set or changed through user set-up. Alternatively, a similarity criterion is provided to set N to a predetermined value more than the criterion.

Figure 8:
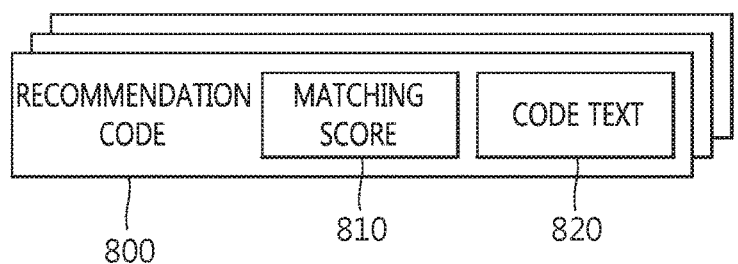
FIG. 8 is a diagram illustrating a data structure of a recommended code set.

FIG. 8 is a diagram illustrating a data structure of a recommended code set.

Referring to FIG. as a data structure of a recommendation code 800 extracted by the recommendation server, multiple data structures may be transmitted to the editor. The data structure of the recommendation code 800 may be constituted by a string 820 of the code and a matching score 810 indicating how the recommendation code matches the context of the developer. The matching score 810 may be given to be higher as the similarity is higher based on a block similarity score. The developer may more easily select the recommendation code 800 suitable for the context by using the matching score 810 by using the matching score 810 in order to solve cumbersomeness which occurs while checking the string 820 of the code one by one at the time of selecting the recommendation code.

Figure 9:
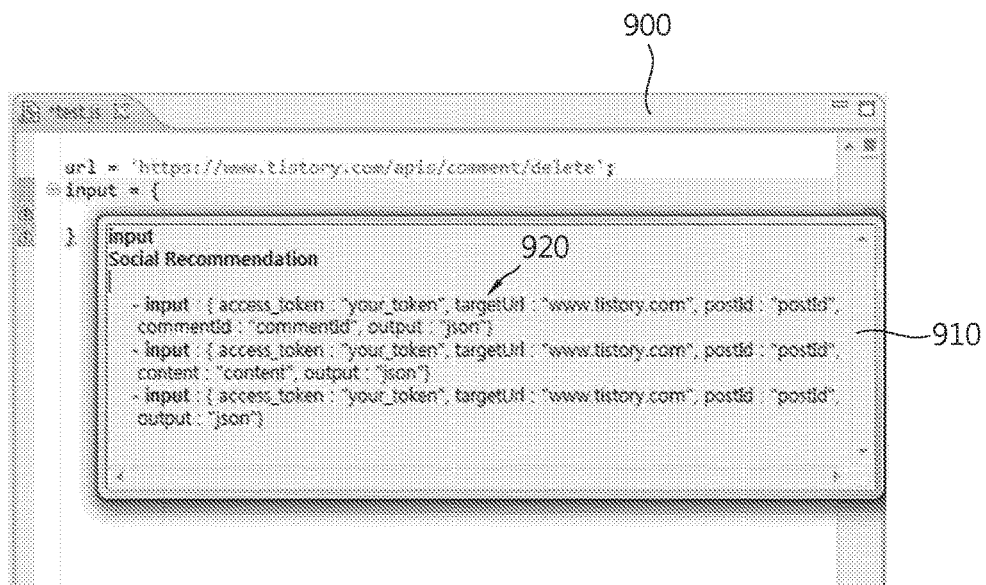
FIG. 9 is a diagram illustrating an embodiment in the editor in which the plug-in is installed according to the embodiment of the present invention.

FIG. 9 is a diagram illustrating an embodiment in the editor in which the plug-in is installed according to the embodiment of the present invention.

Referring to FIG. 9, this is an example in which the mashup is developed in an editor 900 in which the editor plug-in is installed according to the embodiment of the present invention. There are a lot of cases that the mashup developer uses both a service URL and a request parameter of a web service. For example, the developer may input a URL of https://www.tistory.com/apis/comment/delete and subsequently, perform coding of defining the request parameter. According to the embodiment of the present invention, the URL input by the developer is recognized as a primary development context and example codes having high use possibility are filtered out through a recommendation algorithm. The recommendation code is data actually parsed in the source code developed by the mashup. The developer may read some 920 of the recommendation codes through a recommendation display screen 910 of the plug-in.

FIG. 10 illustrates an embodiment of setting a window size for each unit type.

Referring to FIG. 10, statistics may be complied about the length of the unit text based on a high-frequency type in the code repository and for example, the length of a most frequently occurred function call type unit has 31 as a median value and 352 as an average value. Further, the length of a string literal type unit has 8 as the media value and 11 as the average value. In this way, the window size may be decided by using the media value and the average value. The window size may be decided as the media value or the average value and determined through a combination of the median value and the average value.

FIG. 11 is a diagram illustrating an embodiment of a process of configuring a source unit according to the embodiment of the present invention.

Referring to FIG. 11, this illustrates an embodiment showing a process of configuring the source unit. That is, this illustrates a process of analyzing the code given as an example in the editor. When a unit in which the developer interests is "input", the type of the unit may be deduced as a Javascript unit type, an expression statement type, and a simple name type (see reference numeral 1100 of FIG. 11). A total of nine correlated types may be deduced through the processing of deducing the block text containing the front and back context of the input (see reference numeral 1110). The deduced types and block text may constitute a source unit 1120.

Figure 12:
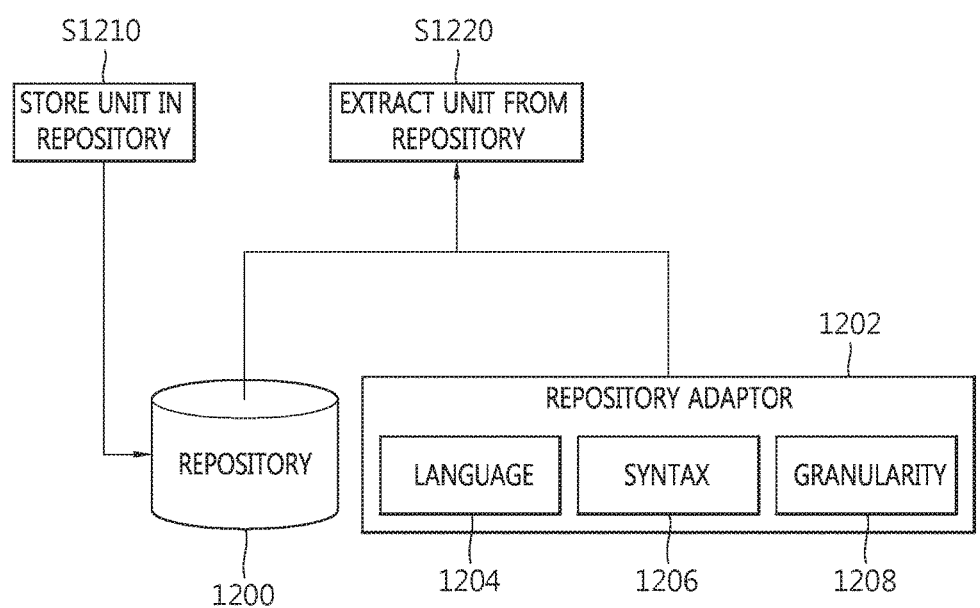
FIG. 12 is a diagram illustrating a code repository and a third party repository adaptor according to the embodiment of the present invention.

FIG. 12 is a diagram illustrating a code repository and a third party repository adaptor according to the embodiment of the present invention.

Referring to FIG. 12, the source code may be called from a code repository 1200 and a third party repository included in the code recommendation server according to the embodiment of the present invention (S1210). Further, the source unit received from the developer may be stored (S1220). This may be achieved through a repository adaptor 1204. The repository adaptor 1204 may analyze various programming languages 1204, a syntax 1206, and granularity 1208 of the source code.

While the invention has been shown and described with respect to the preferred embodiments, it will be understood by those skilled in the art that various changes and modifications may be made without departing from the spirit and scope of the invention as defined in the following claims.

What is claimed is:

1. A system for code recommendation and share, the system comprising:
    a processor that executes program code stored in a memory, the program code comprising:
    editor plug-in program code that monitors developer interactions with the processor and that extracts source code unit information of the developer;
    code recommendation server program code in communication with both the editor plug-in program code and a code repository storing code data,
    wherein the code recommendation server program code selects a plurality of recommendation code data in the code repository through a code recommendation algorithm based on the source code unit it of the developer extracted in the editor plug-in program code,
    wherein data of the source code unit extracted through the editor plug-in program code includes at least one of string information, type information, window size information, and context information of a source code unit which the developer inputs or interests in;
    wherein the context information includes a block text with a predetermined length including a unit string; and
    wherein upon the developer not selecting one of the plurality of recommendation code data, further monitoring of the developer interactions is undertaken by the editor plug-in program code and further extracting by the editor plug-in program code is performed as a result of the further monitoring until the developer selects recommended code data to use.

2. The system of claim 1, wherein the editor plug-in program code receives the recommendation code data from the code recommendation server program code and insets the code selected into the source code and reports the code to the code recommendation server program code.

3. The system of claim 1, wherein: the code recommendation server program code selects the recommendation code data through a first step of filtering a target unit—the target unit means a code unit which is stored in the code repository and becomes the recommendation code—by deducing a type having high correlation with the type of the source code unit based on type information of the source code unit, a second step of adjusting the length of the target unit to suit the window size based on window size information of the source code unit, and a third step of arranging the recommendation code by calculating a similarity between a block text containing basic string matching or a front and back context of the source unit text and the target unit based on context information of the source code unit.

4. The system of claim 3, wherein: step 3 includes one of finally selecting only upper N recommendation codes by arranging the recommendation code by calculating the similarity between the block text and the target unit when the context information exists, and selecting the recommendation code through the basic string matching when the context information does not exist.

5. The system of claim 3, wherein the recommendation code data is constituted by the string of the recommendation code and a matching score indicating a matching degree with the context of the developer.

6. The system of claim 1, wherein the editor plug-in program code is used to decide the window size at the time of generating the source unit data by compiling statistics about the length of the unit text based on a high-frequency type in the code repository.

7. The system of claim 1, wherein when the source code unit is received through the editor plug-in program code, the editor plug-in program code stores the source code unit in the code repository as code data to be recommended later.

8. The system of claim 1, wherein: the code repository is provided in plural, and the code recommendation server program code calls code data from a third party repository and further includes a repository adaptor that analyzes a programming language, a syntax, and granularity for the code data stored in the third party repository.

9. A method for code recommendation and share, the method comprising:
    monitoring developer interactions by an editor having editor plug-in program code;
    extracting, by the editor plug-in program code, source code unit information of a developer by interlocking with an editor of the developer,
    wherein data of the source code unit extracted through the editor plug-in program code includes at least one of string information, type information, window size information, and context information of a source code unit which the developer inputs or interests in;
    wherein the context information includes a block text with a predetermined length including a unit string; and
    selecting, by code recommendation server program code, a plurality of recommendation code data in a code repository through a code recommendation algorithm based on the source code unit information of the developer extracted in the editor plug-in program code, and providing the plurality of recommendation code for selection by the developer, wherein upon the developer not selecting one of the plurality of recommendation code data, further monitoring of the developer interactions is undertaken and further extracting by the editor plug-in is performed as a result of the further monitoring with the developer selects recommended code data to use.

10. The method of claim 9, further comprising:
receiving, by the editor plug-in program code, the recommendation code data from the code recommendation server program code and providing the received recommendation code data to the editor;
inserting the code unit selected by the editor and into the source code; and
reporting the selected code unit to the code recommendation server program code.

11. The method of claim 9, wherein: the selecting of the recommendation code data includes:
a first step of filtering a target unit—the target unit means a code unit which is stored in the code repository and becomes the recommendation code—by deducing a type having high correlation with the type of the source code unit based on type information of the source code unit,
a second step of adjusting the length of the target unit to suit the window size based on window size information of the source code unit, and
a third step of arranging the recommendation code by calculating a similarity between a block text containing basic string matching or a front and back context of the source unit text and the target unit based on context information of the source code unit.

12. The method of claim 11, wherein: step 3 includes one of finally selecting only upper N recommendation codes by arranging the recommendation code by calculating the similarity between the block text and the target unit when the context information exists, and selecting the recommendation code through the basic string matching when the context information does not exist.

13. The method of claim 11, wherein the recommendation code data is constituted by the string of the recommendation code and a matching score indicating a matching degree with the context of the developer.

14. The method of claim 9, further comprising: deciding, by the editor plug-in program code, the window size at the time of generating the source unit data by compiling statistics about the length of the unit text based on a high-frequency type in the code repository.

15. The method of claim 9, further comprising: storing the source code unit in the code repository as code data to be recommended later when the code recommendation server program code receives the source code unit through the editor plug-in program code.

16. The method of claim 9, further comprising: wherein the code repository is provided in plural, and calling, by the code recommendation server program code, code data from a third party repository and analyzing a programming language, a syntax, and granularity for the code data stored in the third party repository through a repository adaptor.

* * * * *